Dec. 23, 1958  S. FÜRST  2,865,577
SPOOL HOLDING ARRANGEMENT
Filed Oct. 29, 1954  4 Sheets-Sheet 1

INVENTOR.
STEFAN FÜRST
BY

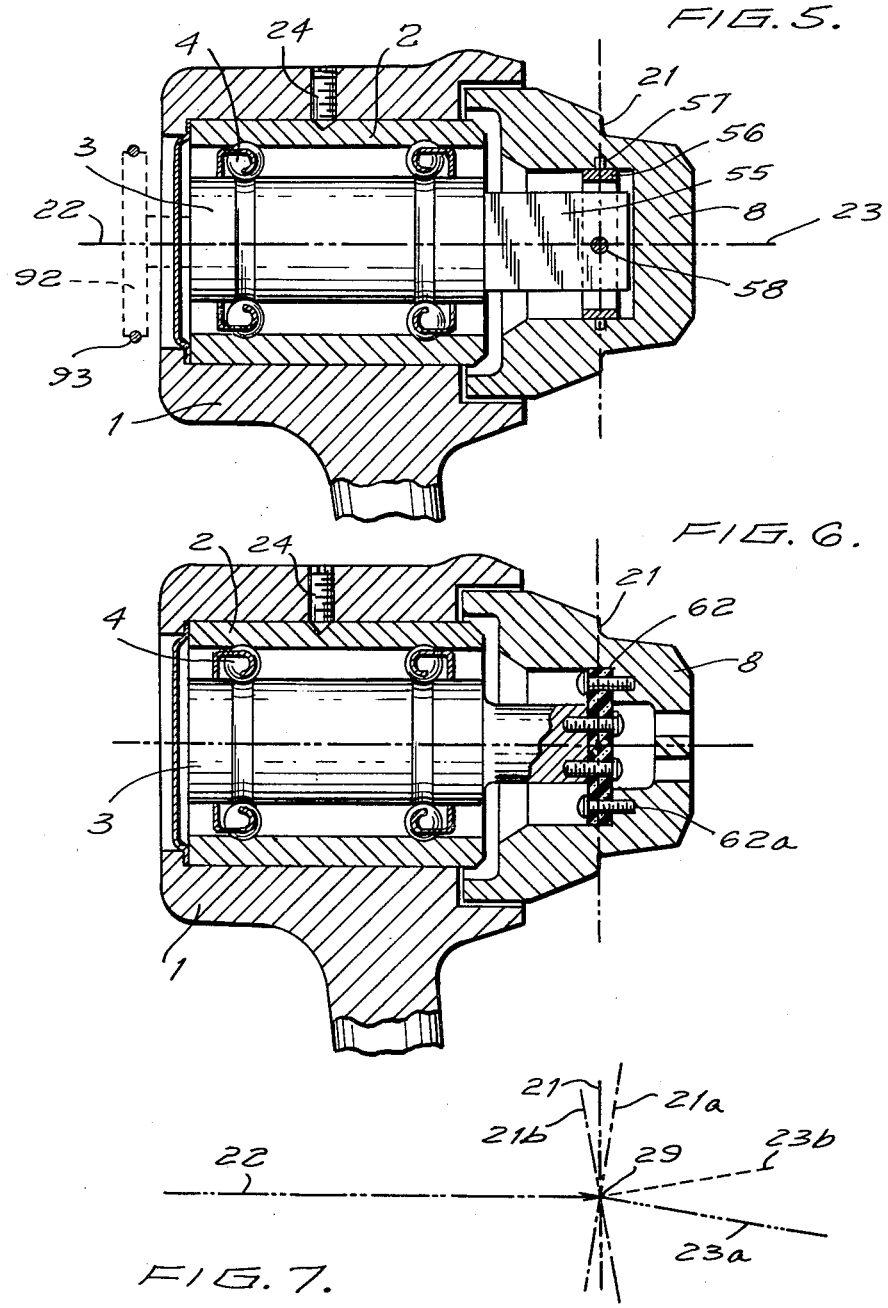

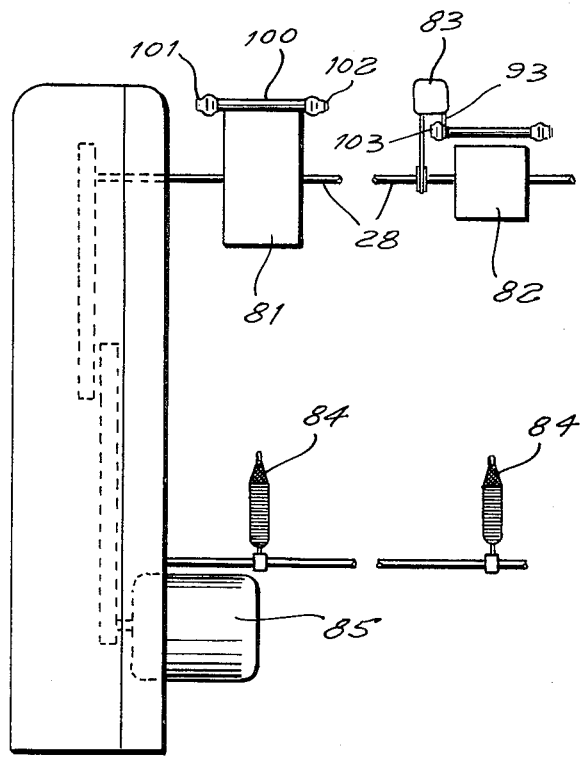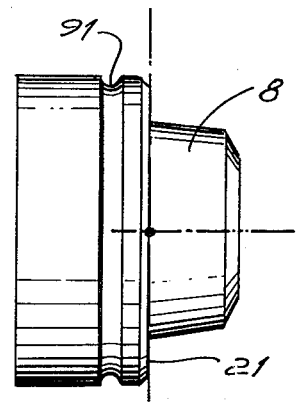

United States Patent Office 2,865,577
Patented Dec. 23, 1958

2,865,577

SPOOL HOLDING ARRANGEMENT

Stefan Fürst, M.-Gladbach, Germany, assignor to Dr. Ing. Walter Reiners, M.-Gladbach, Germany Application October 29, 1954, Serial No. 465,703

Claims priority, application Germany October 29, 1953

15 Claims. (Cl. 242—129.51)

The present invention relates to a spool holding arrangement, and more particularly to a spool handling arrangement for winding machines.

In winding machines the spool, on which thread is wound, is mounted between two spool holding means which engage the end faces of the spool. It is desirable that the axes of the bearings of the spool holding means coincide with the axis of the spool body. However, this condition is very difficult to obtain in winding machines since a very heavy construction is required for assuring an exact coinciding of the axes.

It is the object of the present invention to overcome this difficulty and to provide an arrangement in which the axes of the spool holding means coincide with the axis of the spool.

It is another object of the present invention to mount a spool holding means in such a manner that it is not only rotatable about its axis, but also turnable within pre-determined limits in a plurality of directions transverse to its axis.

It is a further object of the present invention to provide means for mounting the spool holding means on a supporting means for rotation and for pivotal movement in such manner that an annular shoulder of the spool holding means which abuts against a spool is located in a plane extending transverse to the axis of the spool holding means and passing substantially through the fulcrum of the pivotal movement.

With these objects in view the present invention mainly consists in a spool holding arrangement used in a winding machine and comprising in combination, a supporting means and a spool holding means having an axis, and being mounted on the supporting means rotatable about the axis thereof and turnable within predetermined limits relative to its axis.

The wound spool is held between two spool holding means according to the present invention. The drive spool holding means rotates the spool, and the other spool holding means is driven by the spool. During operation the drive spool holding means may assume a position in which its axis is inclined with respect to the axis of the drive shaft connected thereto, and the spool holding means which is rotated by the spool may assume a position in which its axis is inclined with respect to the spool axis.

Various means may be provided for mounting the respective spool holding means on supporting means rotatable and turnable within predetermined limits. According to one embodiment of the present invention a resilient means such as the rubber body or a coil spring connects the spool holding means to the supporting means. According to another embodiment of the present invention the supporting means include a convex spherical bearing surface on which the spool holding means is mounted by means of a concave spherical bearing face. Universal joint means are also suitable for connecting the spool holding means with the supporting means. In the event that the supporting means are constructed as a stationary shaft, an annular concave bearing face is provided on the shaft, the spool holding means is provided with a concave spherical inner bearing surface and balls are arranged between the bearing surfaces to form a ball bearing permitting transverse oscillation of the spool holding means during rotation.

According to a preferred embodiment the spool holding means is hollow and the means, by which it is mounted on the supporting means, are arranged within the interior of the hollow spool holding means.

The spool holding means is preferably provided with an annular shoulder located in a plane perpendicular to its axis. The spool is mounted on a center portion of the spool holding means abutting against the annular shoulder. It is particularly advantageous to locate the shoulder in such manner that the fulcrum about which the spool holding means pivots is located substantially in the plane of a circular shoulder and in the center of the same. This point is also located on the axis of the supporting means and is the point in which the axis of the supporting means, and the axis of the spool holding means intersect during transverse oscillation of the spool holding means. By this arrangement wobbling of the spool holding means is avoided which may take place otherwise when the axis of the spool holding means does not coincide with the axis of the supporting means. The arrangement has the advantage that any stress on the spool in axial direction is avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 5 is a longitudinal sectional view of another modified embodiment according to the present invention;

Fig. 6 is a longitudinal sectional view of still another embodiment of the present invention;

Fig. 7 is a schematic diagram illustrating a feature of the present invention;

Fig. 8 is a schematic view illustrating arrangements according to the present invention in a winding machine; and Fig. 9 is a side elevation illustrating an embodiment of the spool holding means according to the present invention.

Figure 1:
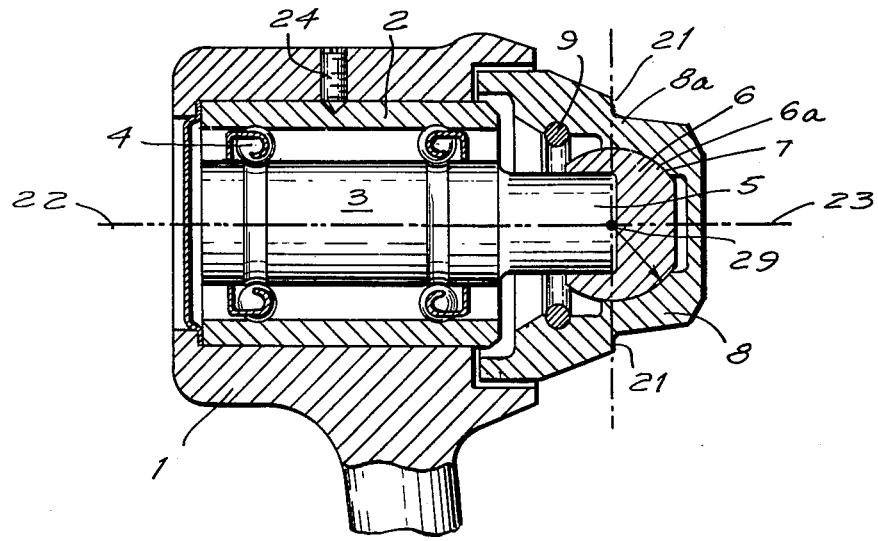
Fig. 1 is a longitudinal sectional view of one embodiment of the present invention.

Referring now to the drawings, and more particularly to Fig. 1, a tubular support 1 houses the outer ring 2 of a ball bearing whose balls 4 run in grooves of a shaft means 3. A screw 24 secures the ball bearing ring 2 to the support 1. Shaft means 3 has an end portion projecting from the tubular support 1 and carries a supporting member 6 which is fixedly secured thereto. Supporting member 6 has a convex outer spherical bearing surface 6a which is located in the interior of a hollow spool holding means 8. The spool holding means have an inner spherical bearing surface 7 which slidably engages the outer bearing surface 6a. A split ring means 9 resiliently engages an annular groove in the inner surface of spool holding means 8 and also the supporting member 6 whereby the spool holding means 8 is secured to the supporting means 3, 5, 6. A similarly constructed spool holding means 8' engages the other end of the spool.

The outer surface of the spool holding means 8 is formed with a circular annular shoulder 21 which is located in a plane extending perpendicular to the axis of the spool holding means 8 and engages the end face of a spool mounted on the projecting portion 8a of the spool holding means 8. The arrangement is such that the fulcrum of the pivotal movement of the spool holding means 8 on the supporting member 6 is located in the plane in which the annular face 21 is located. In other words, when during transverse oscillation the axis of the spool holding means 8 is inclined with respect to the axis of the supporting means 3, 5, 6, the two axes intersect in a point which is located in the above-mentioned plane of the annular shoulder 21. By this arrangement wobbling of the spool holding means and of the spool supported thereon is avoided.

Figure 2:
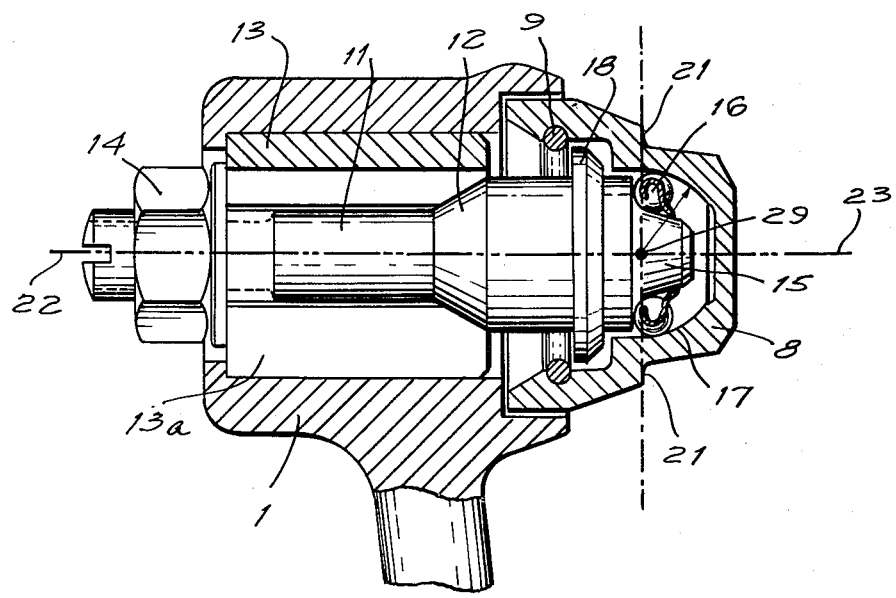
Fig. 2 is a longitudinal sectional view of another embodiment of the present invention.

In the embodiment illustrated in Fig. 2, a stationary supporting means is provided in the form of a shaft means 11 which has a frusto-conical face 12 and a threaded end portion 11a projecting out of the tubular support 1. An expandable annular member 13, which has a longitudinal slot 13a, engages the frusto-conical face 12 with a corresponding frusto-conical face. When the nut 14 is turned, the frusto-conical face 12 causes expansion of the annular member 13 which engages the inner cylindrical surface of the tubular support 1 and clamps the supporting shaft means 11. This arrangement has the advantage that the shaft means, and the spool holding means 8 mounted thereon can be easily exchanged and replaced.

One end of the shaft means 11 projects out of the tubular support 1 and has a concave annular bearing face 15 which is located opposite the concave spherical bearing face 17 of the spool holding means 8. Balls 16 are arranged between the bearing faces 15 and 17 and permit rotation of the spool holding means 8 as well as pivotal transverse movement of the same. A flange 18 is fixed on the supporting shaft 11 and is engaged by a split ring 9 which engages a groove in the inner surface of the spool holding means 8 so that the spool holding means is held on the supporting shaft means 11.

An annular circular shoulder 21 against which the end of the spool abuts during operation, is provided on the outer surface of the spool holding means 8. As described with reference to Fig. 1, the plane passing through the annular shoulder 21 passes through the center of the spherical bearing face 17 which is the fulcrum about which the spool holding means 8 pivots in transverse directions.

The reference numeral 23 designates the axis of the spool holding means 8, and the reference numeral 22 designates the axis of the supporting shaft means 11, and it will be understood that the plane of the circular shoulder 21 passes through the point 29 in which the axes 22 and 23 intersect during transverse pivotal movement of the spool holding means 8.

Figure 3:
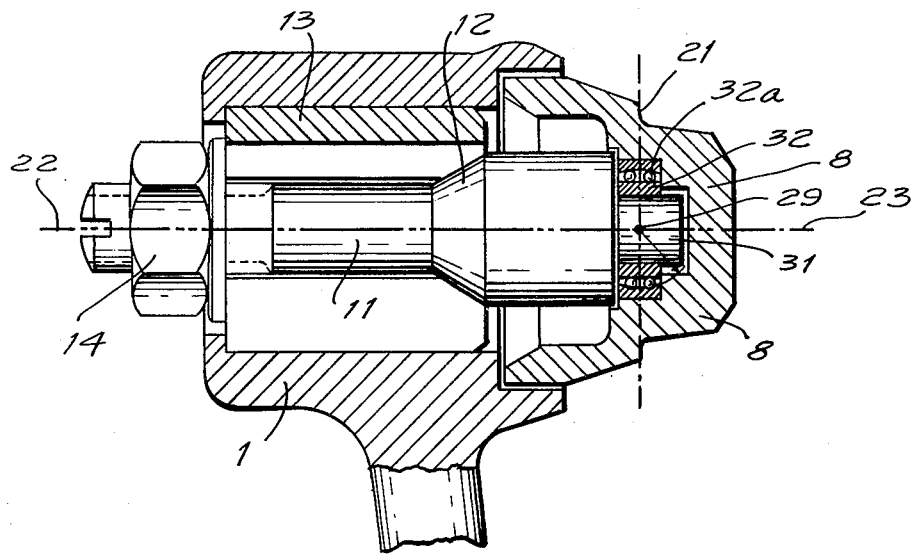
Fig. 3 is a longitudinal sectional view of a further embodiment of the present invention.

Referring now to Fig. 3 which illustrates an embodiment which generally corresponds to the embodiment shown in Fig. 2, the end portion 31 of the shaft means 11 projects into the interior of the hollow spool holding means 8. The inner ring of a ball bearing 32 is attached by press fit to the end portion 31, and the outer ring 32a of the ball-bearing is attached to the spool holding means 8. The inner surface of the outer ring 32a is annular and concave so that the spool holding means 8 is free to pivot about the point 29 in which the plane of the circular shoulder 21 intersects with the axes 23 and 22, respectively.

Figure 4:
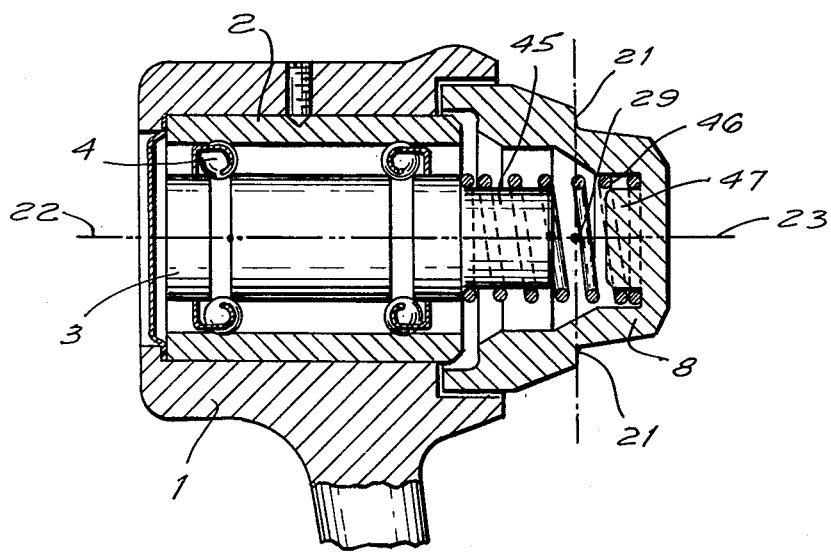
Fig. 4 is a longitudinal sectional view of a modified embodiment of the present invention.

Fig. 4 illustrates a modified embodiment of the present invention which generally corresponds with the arrangement shown in Fig. 1. The spool holding means 8 are connected to the portion 45 of the rotary shaft means 3 by a coil spring 46 which is attached to a projecting central portion in the interior of the hollow spool holding means 8. The end faces of the shaft portion 45 and of the central portion 47 are spaced from each other so that the spool holding means 8 is free to perform a transverse pivotal movement. The coil spring 46 is tensioned so that the spool holding means 8 tends to return to the illustrated position in which the axis 22 of the shaft 3 coincides with the axis 23 of the spool holding means, whenever the spool holding means is turned transversely into a position in which the axis 23 thereof intersects the axis 22 at the point 29.

Fig. 5 illustrates another modified embodiment of the present invention in which a universal joint means connects the shaft means 3 with the spool supporting means 8. A frame member 56 is secured by pivot pins 58 to a prismatic portion of the shaft 3. Pins 57 are secured to frame 56 and project into corresponding bores in the interior of the spool holding means 8 so that the spool holding means can turn in any direction transverse to the axis 23.

Fig. 5 shows in broken lines a pulley means 92 secured to the shaft 3. A belt means 93 passes over the pulley means 92 so that the shaft 3, and thereby the spool holding means 8 can be driven for rotating a spool held by the spool holding means 8.

Fig. 6 illustrates an arrangement in which an end portion of the shaft 3 is connected to the spool holding means 8 by screws 62a and by a rubber member 62 which preferably consists of foam rubber. As described with reference to the other embodiments, the spool holding means 8 is free to perform a transverse pivotal movement since the rubber member 62 constitutes a resilient connection.

Fig. 7 schematically illustrates the transverse oscillation of the axis of the spool holding means 8. While the axis of the supporting means 22 remains stationary, the spool holding means 8 oscillates transversely between positions in which the axis 23 thereof moves between the positions 23a and 23b. The plane of the circular shoulder 21 correspondingly oscillates between the positions 21a and 21b, and passes through the point 29 at which the axes 22 and 23 intersect.

While it is preferred to have the intersecting point 29 located exactly in the plane of the circular shoulder 21, substantially the same result is obtained if the fulcrum 29 of the transverse oscillation is spaced in axial direction from the plane of the circular shoulder 21 a distance which is less than a quarter of the diameter of the circular shoulder 21.

Fig. 8 illustrates a general arrangement according to the present invention in which motor 85 drives a shaft means 28. On the left side of the Fig. 8, an arrangement is shown in which a thread guide drum is fixedly connected with the shaft 28. The spool body 100, which is supported on spool holding means 101 and 102 according to the present invention, is driven by surface friction between the built-up body of thread and the drum 81. According to the arrangement illustrated on the right side of Fig. 8, the thread guide drum 82 is smaller, and the spool holding means 103 is driven from shaft 28 through a transmission means 83 and a belt 93. The construction of the spool holding means 103 is illustrated in Fig. 5. In this arrangement it is necessary to provide an automatically regulated transmission means 83 which reduces the rotary speed corresponding to the diameter increase of the wound body of thread in such manner that the speed of the surface of the wound body of thread remains constant. The thread is supplied to the spools 100 from thread supply means 84.

Fig. 9 illustrates a construction of the spool holding means in which the same is directly driven from the outside. The outer surface of the spool holding means 8 is provided with a groove 91 which receives the belt means 93 illustrated in Fig. 8. While in the construction of Fig. 5 the spool holding means is driven from the inside, it is driven from the outside in the construction illustrated in Fig. 9.

It will be understood that each of the elements described above, or two or more together, may also find a useful application in other types of spool holding arrangements differing from the types described above.

While the invention has been illustrated and described as embodied in a spool holding arrangement including a rotary spool holding means mounted for limited turning movement in directions transverse to its axis, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention and, therefore, such adaptations should and are intended to be comprehended within the meaning and range of equivalence of the following claims.

What is claimed as new and desired to be secured by Letters Patent is:

1. In a winding machine, a spool holding arrangement, comprising, in combination, a tubular support having a cylindrical inner surface; a supporting shaft means having a first axis and a frusto-conical face located in said tubular support; an annular expandable member having an outer surface engaging said inner surface of said tubular support and a frusto-conical end face engaging said frusto-conical face of said supporting shaft means; means mounted on said tubular support for urging said frusto-conical faces against each other so as to expand said annular expandable member for fixedly clamping the same and said shaft means to said tubular support; a spool holding means having a second axis and an outer annular shoulder having a guide face adapted to engage the end face of a spool and located in a plane perpendicular to said second axis; and means for mounting said spool holding means on said supporting shaft means with said first and second axes intersecting at a point located in said plane so that said spool holding means is rotatable about said second axis and pivotable about said point in a plurality of directions transverse to said first axis.

2. A spool holding arrangement as claimed in claim 1 wherein said means for mounting said spool holding means include a portion on said shaft means having a concave annular bearing surface; a portion of said spool holding means having a concave spherical inner bearing surface; ball means arranged between said bearing surfaces; and ball bearing cage means associated with said ball means.

3. An arrangement as claimed in claim 1 and including a fixed flange on said supporting shaft means; and a split ring means engaging said spool holding means and said flange for holding said spool holding means on said shaft means.

4. In a winding machine, a spool holding arrangement, comprising in combination, a supporting means having a first axis; a spool holding means having a second axis and an outer surface including an annular shoulder having a guide face located in a plane perpendicular to said second axis and adapted to engage one end face of a spool held by said spool holding means; and means for mounting said spool holding means on said supporting means rotatable about said second axis and pivotable within predetermined limits in a plurality of directions transverse to said second axis, the arrangement being such that said first and second axes intersect at a point located in said plane of said guide face during pivotal movement of said spool holding means.

5. In a winding machine, a spool holding arrangement, comprising in combination, a supporting means having a first axis; a spool holding means having a second axis and an outer surface including a circular shoulder having a predetermined diameter and having a guide face located in a plane perpendicular to said second axis and adapted to engage one end face of a spool held by said spool holding means; and means for mounting said spool holding means on said supporting means rotatable about said second axis and pivotable within predetermined limits in a plurality of directions transverse to said second axis, the arrangement being such that said first and second axes intersect at a point located spaced from the point of intersection of said plane of said guide face with said second axis a distance smaller than a quarter of said predetermined diameter of said circular shoulder.

6. In a winding machine, a spool holding arrangement, comprising in combination, a stationary supporting shaft means having a concave annular bearing surface; a spool holding means having an axis and a concave spherical inner bearing surface having a center located on said axis and an outer surface including a circular shoulder having a guide face located in a plane perpendicular to said axis and passing through said center, said guide face being adapted to engage one end face of a spool held by said spool holding means; ball means arranged between said bearing surfaces for mounting said spool holding means on said supporting means rotatable about said axis and pivotable within predetermined limits in a plurality of directions transverse to said axis about said center of said spherical inner bearing surface.

7. In a winding machine a spool holding arrangement comprising, in combination, a tubular support; a shaft means having a first axis and being rotatably mounted in said tubular support having an end portion projecting from the same; a supporting member secured to said end portion and having a convex outer spherical bearing surface; and a hollow spool holding means having a second axis intersecting with said first axis in a predetermined point, said hollow spool holding means having an inner surface including a concave spherical inner bearing surface slidably engaging said convex spherical surface of said supporting member for mounting said spool holding means rotatably about the second axis and pivotable within predetermined limits in a plurality of directions transverse to said second axis, said spool holding means having an outer surface including an annular shoulder having a guide face adapted to engage one end face of a spool held by said spool holding means, said guide face being located in a plane perpendicular to said second axis and passing through said point in which said first and second axes intersect during pivotal movement of said spool holding means.

8. In a winding machine, a spool holding arrangement, comprising, in combination, a tubular support; shaft means rotatably mounted in said tubular support and having an end portion projecting from the same; a supporting member secured to said end portion and having a convex outer spherical bearing surface; and a hollow spool holding means having an axis and an inner surface including a concave inner spherical bearing surface slidably engaging said outer spherical surface of said supporting member for mounting said spool holding means rotatable about its axis and pivotable within predetermined limits about the center of said concave spherical inner bearing surface, said spool holding means having an outer surface including a circular shoulder having a guide face adapted to engage one end face of the spool held by said spool holding means and being located in a plane perpendicular to said axis and passing through said center of said spherical inner bearing surface.

9. In a winding machine, a spool-holding arrangement comprising, in combination, a supporting means having an outer bearing surface having a first axis; a spool-holding means having a second axis and a concave spherical inner bearing surface having a center located on said second axis, said spool holding means having an outer annular shoulder having a guide face located in a plane perpendicular to said second axis and passing through said center, said guide face being adapted to engage one end face of a spool held by said spool-holding means; ball means arranged between said bearing surfaces for mounting said spool-holding means on said supporting means in a position in which said first axis passes through said center so that said spool-holding means is rotatable about said second axis and pivotable transverse to said axes about said center of said spherical inner bearing surface.

10. In a winding machine, a spool-holding arrangement comprising, in combination, a supporting means having a cylindrical outer bearing surface having a first axis; a spool-holding means having a second axis and a concave spherical inner bearing surface having a center located on said second axis, said spool-holding means having an outer annular shoulder located in a plane perpendicular to said second axis and passing through said center, said annular shoulder having a guide face being adapted to engage one end face of a spool held by said spool-holding means; ball means arranged between said bearing surfaces for mounting said spool-holding means on said supporting means in a position in which said first axis passes through said center so that said spool-holding means is rotatable about said second axis and pivotable transverse to said axes about said center of said spherical inner bearing surface.

11. In a winding machine, a spool-holding arrangement comprising, in combination, a rotary supporting means having a first axis; a spool-holding means having a second axis and an outer surface including an annular shoulder having a guide face located in a plane perpendicular to said second axis and adapted to engage one end face of a spool held by said spool-holding means; and resilient means secured to said supporting means and to said spool-holding means for resiliently supporting said spool-holding means on said supporting means in a position in which said first and second axes intersect at a point located in said plane of said guide face whereby said spool-holding means is rotatable about said second axis and pivotable about said point transverse to said axes.

12. In a winding machine, a spool-holding arrangement comprising, in combination, a rotary supporting means having a first axis; a hollow spool-holding means having a second axis and an outer surface including an annular shoulder having a guide face located in a plane perpendicular to said second axis and adapted to engage one end face of a spool held by said spool-holding means, said hollow spool-holding means having an axial opening receiving an end portion of said supporting means; and a resilient disc having a center portion secured to said end portion of said supporting means and a rim portion secured to said spool-holding means, said resilient disc being located in the interior of said hollow spool-holding means and resiliently supporting the same on said supporting means in a position in which said first and second axis intersect at a point located in said plane of said guide face whereby said spool-holding means is rotatable about said second axis and pivotable about said point transverse to said axes.

13. In a winding machine, a spool-holding arrangement comprising, in combination, a rotary supporting means having a first axis; a hollow spool-holding means having a second axis and an outer surface including an annular shoulder having a guide face located in a plane perpendicular to said second axis and adapted to engage one end face of a spool held by said spool-holding means, said hollow spool-holding means having an axial opening receiving an end portion of said supporting means; and a coil spring located within said hollow spool-holding means and having one end secured to said end portion of said supporting means, and the other end secured to said spool-holding means for resiliently supporting said spool-holding means on said supporting means in a position in which said first and second axes intersect at a point located in said plane of said guide face whereby said spool-holding means is rotatable about said second axis and pivotable about said point transverse to said axes.

14. In a winding machine, a spool-holding arrangement comprising, in combination, a rotary supporting means having a first axis; a spool-holding means having a second axis and an outer surface including an annular shoulder having a guide face located in a plane perpendicular to said second axis and adapted to engage one end face of a spool held by said spool-holding means and universal joint means connected to said supporting means and to said spool-holding means for supporting said spool-holding means; and resilient means secured to said supporting means and to said spool-holding means for resiliently supporting said spool-holding means on said supporting means in a position in which said first and second axes intersect at a point located in said plane of said guide face whereby said spool-holding means is rotatable about said second axis and pivotable about said point transverse to said axes.

15. In a winding machine, a spool holding arrangement, comprising, in combination, a supporting means having a first axis; a spool holding means having a second axis and an outer surface including an annular shoulder having a guide face located in a plane perpendicular to said second axis and adapted to engage one end face of a spool held by said spool holding means; means for mounting said spool holding means on said supporting means rotatable about said second axis and pivotable within predetermined limits in a plurality of directions transverse to said second axis, the arrangement being such that said first and second axes intersect at a point located in said plane of said guide face during pivotal movement of said spool holding means; other supporting means; and other spool holding means adapted to support the other end face of said spool and being mounted on said other supporting means.

References Cited in the file of this patent

UNITED STATES PATENTS

| | | |
|---|---|---|
| 1,692,441 | Hasbrouck | Nov. 20, 1928 |
| 1,861,646 | Stone | June 7, 1932 |
| 1,955,917 | Jung | Apr. 24, 1934 |
| 2,445,542 | Strozinski | July 20, 1948 |

FOREIGN PATENTS

| | | |
|---|---|---|
| 583,061 | France | Oct. 25, 1924 |
| 596,798 | Great Britain | Jan. 12, 1948 |